US011985650B2

United States Patent
Nakayama et al.

(10) Patent No.: US 11,985,650 B2
(45) Date of Patent: May 14, 2024

(54) WIRELESS LAN COMMUNICATION SYSTEM, UPLINK CONTROL METHOD, AND WIRELESS CONTROL DEVICE

(71) Applicant: NIPPON TELEGRAPH AND TELEPHONE CORPORATION, Tokyo (JP)

(72) Inventors: Shota Nakayama, Musashino (JP); Kenichi Kawamura, Musashino (JP); Yasushi Takatori, Musashino (JP); Keisuke Wakao, Musashino (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 583 days.

(21) Appl. No.: 17/271,352

(22) PCT Filed: Aug. 15, 2019

(86) PCT No.: PCT/JP2019/032039
§ 371 (c)(1),
(2) Date: Feb. 25, 2021

(87) PCT Pub. No.: WO2020/045105
PCT Pub. Date: Mar. 5, 2020

(65) Prior Publication Data
US 2021/0352685 A1    Nov. 11, 2021

(30) Foreign Application Priority Data
Aug. 27, 2018    (JP) .................................. 2018-158768

(51) Int. Cl.
*H04W 72/1263*    (2023.01)
*H04W 72/0453*    (2023.01)
(Continued)

(52) U.S. Cl.
CPC ... *H04W 72/1263* (2013.01); *H04W 72/0453* (2013.01); *H04W 72/541* (2023.01); *H04W 84/12* (2013.01)

(58) Field of Classification Search
None
See application file for complete search history.

(56) References Cited

U.S. PATENT DOCUMENTS

2016/0286469 A1*  9/2016  Wang .................... H04W 48/16
2016/0309505 A1* 10/2016  Kim ...................... H04W 72/23
(Continued)

FOREIGN PATENT DOCUMENTS

| JP | 2017103555 A | 6/2017 |
|----|--------------|--------|
| JP | 6162278 B1   | 7/2017 |
| WO | WO-2017061492 A1 | 4/2017 |

*Primary Examiner* — Phirin Sam
(74) *Attorney, Agent, or Firm* — Harness, Dickey & Pierce, P.L.C.

(57) ABSTRACT

A wireless LAN system in which a BSS composed of one wireless LAN base station and a plurality of wireless LAN terminals belonging to the wireless LAN base station, is set as a unit, and a plurality of the BSSs using an identical channel respectively perform uplink multi-user transmission, includes a radio control apparatus that is connected to the wireless LAN base station of each of the plurality of the BSSs and a wireless LAN terminal of the plurality of wireless LAN terminals of each of the plurality of the BSSs, and configured to collect radio information indicating interference states of respective radio waves, group sets of BSSs of the plurality of the BSSs, which are outside of radio wave reachable ranges of each other, as one of a plurality of groups among the plurality of the BSSs using the identical channel according to the radio information, and perform control to shift a timing of channel access for performing uplink multi-user transmission between the plurality of groups.

9 Claims, 13 Drawing Sheets

(51) Int. Cl.
*H04W 72/541* (2023.01)
*H04W 84/12* (2009.01)

(56) References Cited

U.S. PATENT DOCUMENTS

| | | | |
|---|---|---|---|
| 2016/0316472 A1* | 10/2016 | Kwon | H04W 12/06 |
| 2017/0013422 A1* | 1/2017 | Saiwai | H04W 4/06 |
| 2017/0164340 A1* | 6/2017 | Xu | H04B 7/0413 |
| 2018/0084566 A1* | 3/2018 | Wang | H04W 72/21 |
| 2018/0288803 A1 | 10/2018 | Shinohara et al. | |
| 2019/0059107 A1 | 2/2019 | Inoki et al. | |
| 2019/0289632 A1* | 9/2019 | Lou | H04W 74/006 |
| 2021/0351862 A1* | 11/2021 | Ma | H04W 72/0446 |
| 2022/0264420 A1* | 8/2022 | Grandhi | H04W 48/14 |

* cited by examiner

WIRELESS LAN COMMUNICATION SYSTEM, UPLINK CONTROL METHOD, AND WIRELESS CONTROL DEVICE

CROSS-REFERENCE TO RELATED APPLICATIONS

This application is a 371 U.S. National Phase of International Application No. PCT/JP2019/032039 filed on Aug. 15, 2019, which claims priority to Japanese Application No. 2018-158768 filed on Aug. 27, 2018. The entire disclosures of the above applications are incorporated herein by reference.

TECHNICAL FIELD

The present disclosure relates to a wireless LAN communication system, an uplink control method, and a radio control apparatus that prevent, in a high-density environment of wireless LAN base stations (APs) using the same channel, collisions between control frames (trigger frames and MU-RTS) used for control of multi-user transmissions by each of the APs and that increase communication efficiency.

BACKGROUND ART

In a 5G-era multiple access environment, a mobile cooperative wireless LAN system has been studied that increases system capacity even in a high-density environment of the AP by controlling the wireless LAN base station (AP) in cooperation with a mobile line.

The mobile cooperative wireless LAN system is composed of a radio control apparatus, the wireless LAN base station (AP), and a wireless LAN terminal (STA) and is operated in a multi-band, multiple access environment. The radio control apparatus connects to the AP of the network in the system and performs information collection and control. Additionally, the STA is connected to the AP via a wireless LAN, and transmits radio environment information to the radio control apparatus through internal network or cellular network. As one example of such a mobile cooperative wireless LAN system, the radio control apparatus estimates the degree of exposure between the APs based on radio environment information collected in PTL 1. By calculating the degree of exposure between the APs, transmission power control and reception power threshold value control of each AP can be appropriately performed in accordance with the radio environment, and the communication capacity can be increased.

Additionally, IEEE802.11ax (hereinafter 11ax) has been proposed as a next-generation wireless LAN standard in which IEEE802.11ac (hereinafter, 11ac) is further speeded up. 11ax introduces new interference avoidance technology and frequency selection technology to avoid a reduction in communication speed and a reduction in a communication opportunity, or the like due to congestion in a radio environment. Among these, a multi-user transmission technology may be used in which the average throughput per user is improved and each user can maintain the communication speed even when a large number of users are connected. In 11ac, the downlink communication efficiency is improved by the introduction of the multi-user MIMO (MU-MIMO) in the downlink direction. In 11ax, implementation of MU-MIMO and Orthogonal Frequency Division Multiple Access (OFDMA) in the uplink direction and the downlink direction is being considered, and further improvement in communication efficiency is expected.

As described above, even in the mobile cooperative wireless LAN system, it is necessary to further improve the communication efficiency by the wireless LAN control compliant to the 11ax that is the next-generation wireless LAN standard.

CITATION LIST

Patent Literature

PTL 1: JP 6162278 B

SUMMARY OF THE INVENTION

Technical Problem

With the widespread use of the wireless LAN, a high-density environment of the wireless LAN base station (AP) is frequently generated, and a wireless LAN terminal (STA) of which communication efficiency is reduced is generated due to the influence. In PTL 1, radio information in the system is acquired via the AP or via a cellular line, the exposure environment is estimated, and the parameters of each AP are optimally set to improve the communication efficiency of each STA. FIG. 14 illustrates how the transmission power and the reception power threshold value of the AP are adjusted so that the radio wave reachable range of the AP of the same channel does not overlap. The center of a circle indicates the AP.

As the density of the APs increases, the parameter setting range of the AP is also limited, and thus, as illustrated in FIG. 15, a radio wave interference zone in which the radio wave reachable ranges of the adjacent APs overlap occurs, and communication efficiency may be stagnant and reduced. Additionally, the control frame (trigger frame, MU-RTS, or the like) used in MU-OFDMA, which is one of the characteristics of multi-user (MU) transmission in 11ax, causes collisions and interference between the same channels due to the high density of the APs, and thus the communication efficiency of MU-OFDMA may not be improved.

FIG. 16 illustrates the principle of a trigger frame collision.

In FIG. 16, an AP1 and an AP2 are wireless LAN base stations that use the same channel. The circular range around each AP is the radio wave reachable range. The area in which the radio wave reachable range overlaps is the radio wave interference zone. Additionally, an STA #1 and an STA #2 are terminals belonging to the AP1. Here, it is assumed that AP1 and AP2 are outside each other ⓢradio wave reachable range and are in a hidden terminal relationship and the STA #1 is in an exposed state during reception. In this state, when the AP1 and the AP2 respectively transmit the trigger frame (TRG) to the terminal belonging to the AP1 and the AP2 to perform MU transmission, a collision occurs between the trigger frame of the AP1 and the trigger frame of the AP2 in the STA #1. Accordingly, the STA #1 cannot receive the trigger frame of the AP1 and cannot transmit the uplink data frame.

As described above, when a high-density environment of the 11ax-compatible AP occurs, the trigger frame and the MU-RTS collide, and problems occur in which the number of terminals that cannot transmit/receive increases and spectral efficiency is reduced.

FIG. 17 illustrates an uplink (UL)-OFDMA sequence in flax.

In FIG. 17, the AP1 transmits a trigger frame to belonging STA #1 to STA #3 and notifies the transmission timing of the terminal side and the frequency band to be used. Each terminal implements MU transmission by transmitting a data frame based on the information of the received trigger frame. However, as illustrated in FIG. 16, in a high-density environment of the APs on the same channel, when a collision of a trigger frame occurs in a terminal that is in a reception exposed state, the terminal cannot transmit data. Accordingly, it is necessary to prevent collision of the control frame (trigger frame and data frame) to improve the transmission efficiency in the uplink direction in a high-density environment of the APs on the same channel.

The present disclosure provides a wireless LAN communication system, an uplink control method, and a radio control apparatus that can prevent collision of control frames used by each AP for controlling MU transmission and improve communication efficiency, in a high-density environment of wireless LAN base stations (APs) that use the same channel.

Means for Solving the Problem

The first aspect of the disclosure provides, in a wireless LAN system in which a BSS composed of one wireless LAN base station and a plurality of wireless LAN terminals belonging to the wireless LAN base station, is set as a unit, and a plurality of the BSSs using an identical channel respectively perform uplink multi-user transmission, a radio control apparatus that is connected to the wireless LAN base station of each of the plurality of the BSSs and a wireless LAN terminal of the plurality of wireless LAN terminals of each of the plurality of the BSSs, and configured to collect radio information indicating interference states of respective radio waves, group sets of BSSs of the plurality of the BSSs, which are outside of radio wave reachable ranges of each other, as one of a plurality of groups among the plurality of the BSSs using the identical channel according to the radio information, and perform control to shift a timing of channel access for performing uplink multi-user transmission between the plurality of groups.

In the wireless LAN system according to the first aspect of the disclosure, the radio control apparatus is configured to perform grouping processing for selecting a combination that results in a minimum group number among combinations in which received power from the wireless LAN base station and the wireless LAN terminal between the sets of BSSs is equal to or lower than a predetermined level, based on the radio information.

In the wireless LAN system according to the first aspect of the disclosure, the radio control apparatus is configured to perform grouping calculation using a hierarchical cluster analysis method of sequentially grouping the sets of BSSs having the received power of low value.

In the wireless LAN system according to the first aspect of the disclosure, the radio control apparatus is configured to perform grouping calculation using a random grouping method of randomly selecting, with respect to a first BSS of the plurality of the BSSs that has formed a first group, a second BSS of the plurality of the BSSs that is outside of entire radio wave reachable range of a first group and attach a second BSS to a first group.

In the wireless LAN system according to the first aspect of the disclosure, the radio control apparatus is configured to sequentially assign channel access timing to a group n (n is 1 to N, N is a group number) at a predetermined time interval.

In the wireless LAN system according to the first aspect of the disclosure, the radio control apparatus is configured to sequentially assign channel access timing to the group n (n is 1 to N, N is the group number) at a predetermined time interval and set NAV for other groups.

In the wireless LAN system according to the first aspect of the disclosure, the radio control apparatus is configured to notify whether channel access is possible in response to an inquiry from the wireless LAN base station of each of the plurality of groups.

The second aspect of the disclosure provides, in an uplink control method of a wireless LAN system in which a BSS composed of one wireless LAN base station and a plurality of wireless LAN terminals belonging to the wireless LAN base station, is set as a unit, and a plurality of the BSSs using an identical channel respectively perform uplink multi-user transmission, by a radio control apparatus that is connected to the wireless LAN base station of each of the plurality of the BSSs and a wireless LAN terminal of the plurality of wireless LAN terminals of each of the plurality of the BSSs, collecting radio information indicating interference states of respective radio waves, grouping sets of BSSs of the plurality of the BSSs, which are outside of radio wave reachable ranges of each other, as one of a plurality of groups among the plurality of the BSSs using the identical channel according to the radio information, and performing control to shift a timing of channel access for performing uplink multi-user transmission between the plurality of groups.

The third aspect of the disclosure provides a radio control apparatus of a wireless LAN system in which a BSS composed of one wireless LAN base station and a plurality of wireless LAN terminals belonging to the wireless LAN base station, is set as a unit, and a plurality of the BSSs using an identical channel respectively perform uplink multi-user transmission, in which the radio control apparatus is connected to the wireless LAN base station of each of the plurality of the BSSs and a wireless LAN terminal of the plurality of wireless LAN terminals of each of the plurality of the BSSs, and is configured to collect radio information indicating interference states of respective radio waves, group sets of BSSs of the plurality of the BSSs, which are outside of radio wave reachable ranges of each other, as one of a plurality of groups among the plurality of the BSSs using the identical channel according to the radio information, and perform control to shift a timing of channel access for performing uplink multi-user transmission between the plurality of groups.

Effects of the Invention

According to the present disclosure, in a high-density environment of wireless LAN base stations that uses the same channel, by setting BSSs that are outside of the radio wave reachable range of each other as the same group between BSSs that use the same channel, and shifting the timing of channel access for performing uplink MU transmission between different groups, it is possible to prevent the collision of the control frames used for controlling the MU transmission and improve the communication efficiency.

DESCRIPTION OF EMBODIMENTS

Features of the present disclosure are that a BSS composed of an AP and a plurality of STAs belonging to each AP are set as a unit, a grouping is performed to cause the BSSs that are outside of radio wave reachable ranges between BSSs using the same channel, to be grouped together, and timing of uplink multi-user transmission (UL-MU transmission) is separated between different groups. In other words, the APs of different groups shift the transmission timing of the control frame (trigger frame or MU-RTS) in UL-MU transmission, thereby preventing control frame collision and improving transmission efficiency.

Figure 1:
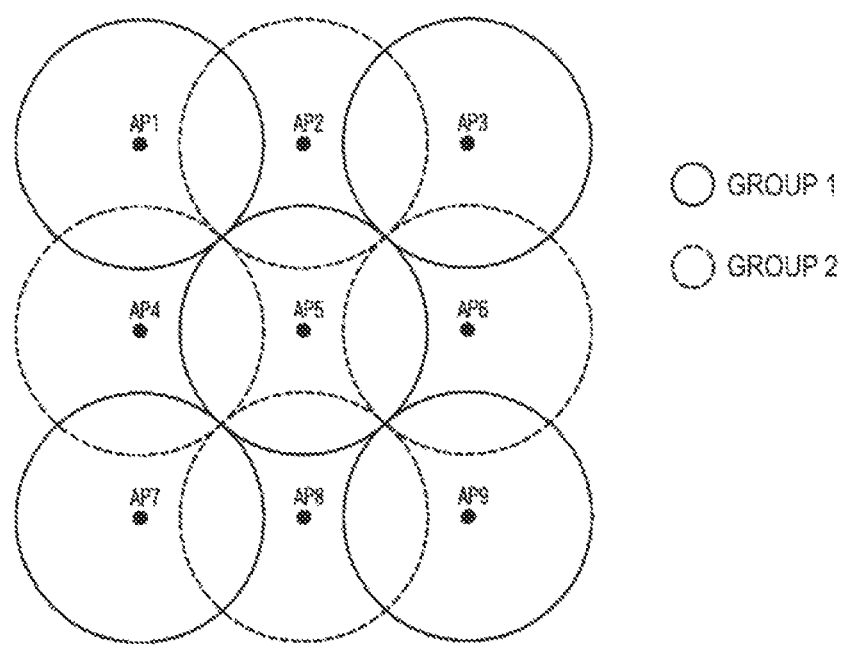
FIG. 1 is a diagram illustrating an example of AP grouping.

FIG. 1 illustrates an example of grouping of wireless LAN base stations (APs).

In FIG. 1, wireless LAN base stations of an AP1 to an AP9 are illustrated, and a radio wave reachable range of each wireless LAN base station is illustrated by a circle. Here, a portion of the radio wave reachable ranges of the adjacent APs overlaps and becomes a radio wave interference zone. Accordingly, the APs that one apart, for example, the AP1, the AP3, the AP5, the AP7, and the AP9 are the BSSs that are outside of the radio wave reachable range, respectively, and thus are in the same group. Similarly, the AP2, the AP4, the AP6 and the AP8 are also in the same group because they are BSSs outside of the radio wave reachable range, respectively.

Figure 2:
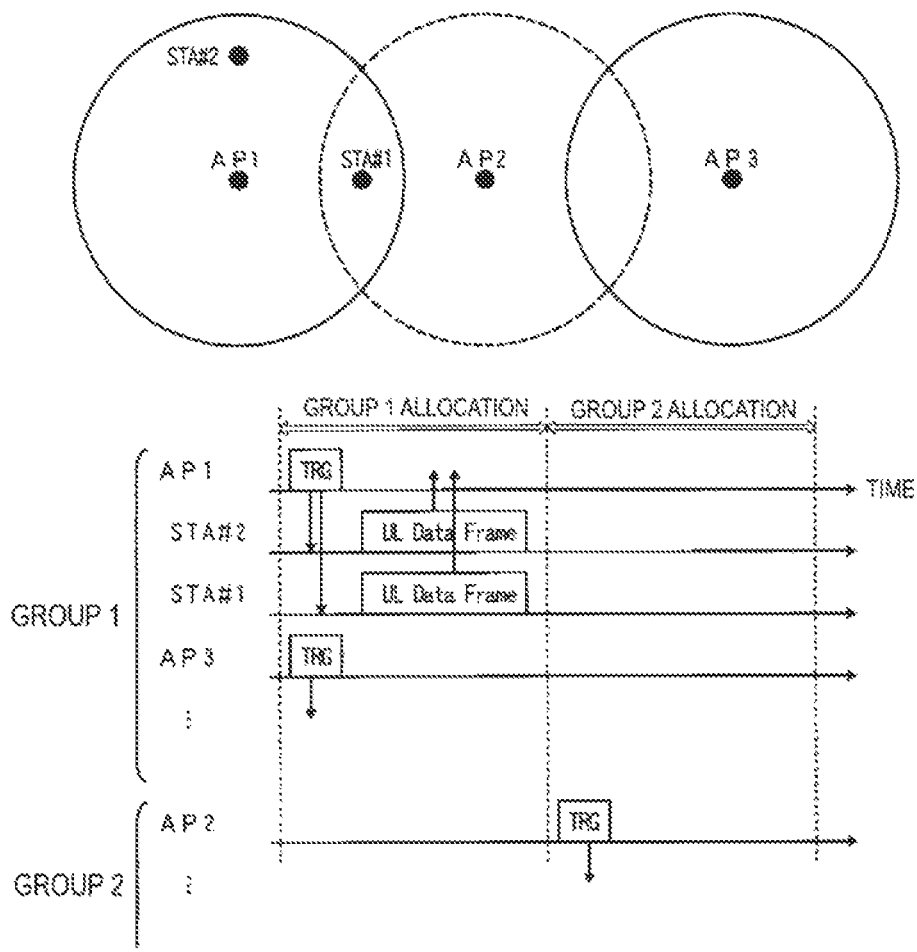
FIG. 2 is a diagram illustrating an example of timing control of UL-MU transmission between different groups.

FIG. 2 illustrates an example of timing control of UL-MU transmission between different groups.

In FIG. 2, the AP1 to the AP3 are wireless LAN base stations that use the same channel, and STA #1 and STA #2 are wireless LAN terminals belonging to the AP1. It is assumed that the AP1 to the AP3 are outside of the radio wave reachable range of each other and are in a hidden terminal relationship, and that the STA #1 is in an exposed state during reception. For the AP1 to the AP3 to perform MU transmission in this state, in the present disclosure, the AP1 and the AP3 are set as a group 1 and the AP2 is set as a group 2, and each group is sequentially permitted channel access by round robin. For example, all the wireless LAN base stations (here, the AP1 and the AP3) belonging to the group 1 can access the channel during the time when the group 1 can access the channel. When the AP1 transmits the trigger frame to the STA #1 and the STA #2 that belong, the trigger frame transmitted by the AP3 is outside of the radio wave reachable range, and the AP2 does not transmit the trigger frame, so there is no collision. In the time zone in which the group 2 can access the channel, all wireless LAN base stations (the AP2 in this case) belonging to the group 2 can access the channel.

Hereinafter, in the mobile cooperative wireless LAN system, a network configuration example of the radio control apparatus, the AP, and the STA corresponding to the present disclosure, and configuration examples of respective apparatuses will be described.

Figure 3:
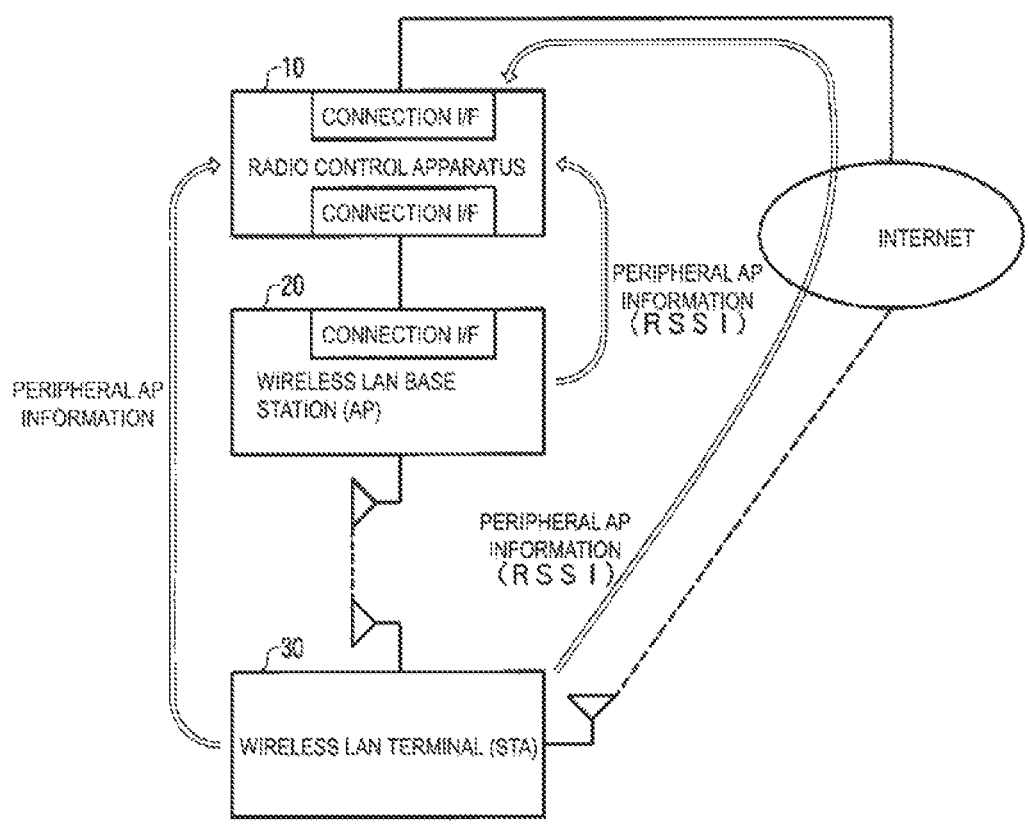
FIG. 3 is a diagram illustrating an example of a network configuration in the present disclosure.

FIG. 3 illustrates a network configuration example in the present disclosure.

In FIG. 3, an AP 20 and an STA 30 are connected by a wireless LAN. The AP 20 and the radio control apparatus 10 are connected by a wired cable. The STA 30 and the radio control apparatus 10 are connected via the AP 20 as well as connected via a mobile line and the Internet. In the radio control apparatus 10, peripheral AP information (RSSI) in the AP 20 is collected, and peripheral AP information (RSSI) and peripheral STA information (RSSI) in the STA 30 are collected via the AP 20 or a mobile line.

Figure 4:
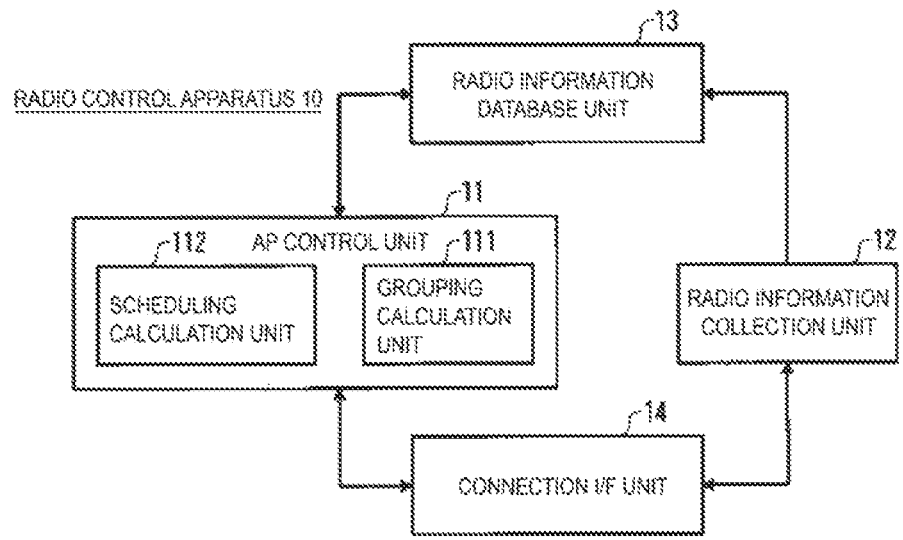
FIG. 4 is a diagram illustrating an example of a configuration of a radio control apparatus 10.

FIG. 4 illustrates a configuration example of the radio control apparatus 10.

In FIG. 4, the radio control apparatus 10 is constituted with an AP control unit 11, a radio information collection unit 12, a radio information database unit 13, and a connection I/F unit 14. The AP control unit 11 includes a grouping calculation unit 111 and a scheduling calculation unit 112. The connection I/F unit 14 connects to each AP and connects to each STA via the Internet.

The radio information collection unit 12 polls the AP 20 and the STA 30, acquires radio information, and stores the information in the radio information database unit 13. The radio information to be collected includes belonging STA information and the peripheral AP information (RSSI) from the AP 20, belonging destination AP information, the peripheral AP information (RSSI), and the peripheral STA information (RSSI) from the STA 30, or the like. The grouping calculation unit 111 of the AP control unit 11 extracts the radio information collected from the radio information database unit 13, calculates grouping, and stores the result in the radio information database unit 13. As an example of the grouping calculation, grouping using a hierarchical cluster analysis method and a method of AP random grouping will be separately described with reference to FIGS. 8 to 11. The scheduling calculation unit 112 acquires a grouping result from the radio information database unit 13 and calculates scheduling. Specifically, it will be described separately with reference to FIG. 12. The AP control unit 11 notifies the AP 20 of the calculation result of the grouping and scheduling and sets the result.

Figure 5:
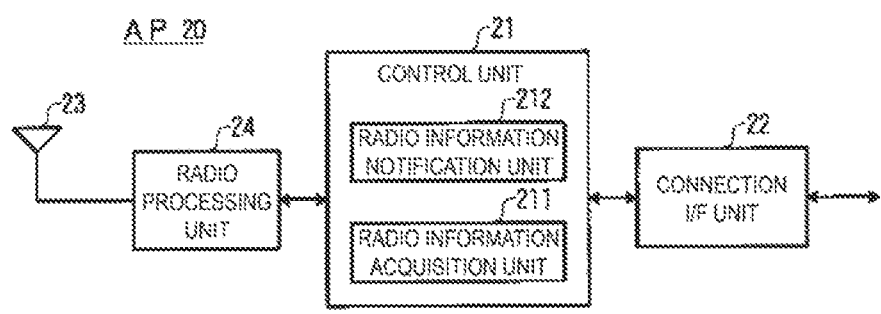
FIG. 5 is a diagram illustrating an example of a configuration of an AP 20.

FIG. 5 illustrates a configuration example of the AP 20. In FIG. 5, the AP 20 is constituted with a control unit 21, a connection I/F unit 22, an antenna 23, and a radio processing unit 24. The control unit 21 includes a radio information acquisition unit 211 and a radio information notification unit 212. The radio information acquisition unit 211 of the control unit 21 collects radio information from other APs and belonging STAs. The radio information notification unit 212 transmits the acquired radio information to the radio control apparatus 10. The control unit 21 receives a control parameter (a schedule of channel access, or the like) from the radio control apparatus 10 and controls the channel access.

Figure 6:
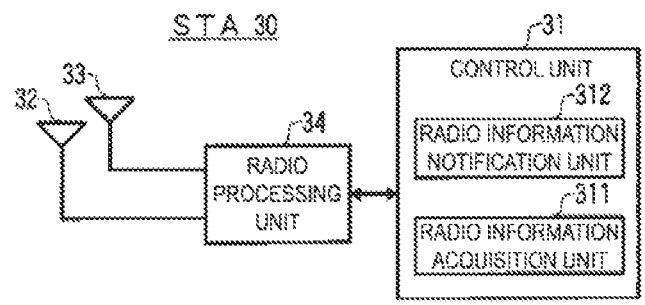
FIG. 6 is a diagram illustrating an example of a configuration of an STA 30.

FIG. 6 illustrates a configuration example of the STA 30. In FIG. 6, the STA 30 is constituted with a control unit 31, antennas 32 and 33, and a radio processing unit 34. The control unit 31 includes a radio information acquisition unit 311 and a radio information notification unit 312. The radio information acquisition unit 311 of the control unit 31 collects radio information from other APs and belonging STAs. The radio information notification unit 312 transmits the acquired radio information to the radio control apparatus 10.

Figure 7:
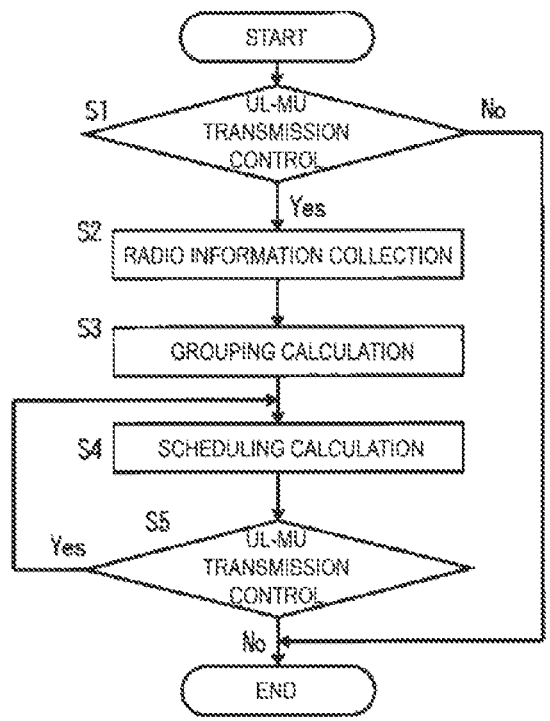
FIG. 7 is a flowchart illustrating an overall processing procedure in a wireless LAN system of the present disclosure.

FIG. 7 illustrates an overall processing procedure in a wireless LAN system of the present disclosure.

In FIG. 7, first, the presence/absence of UL-MU transmission control is set in the radio control apparatus 10 (S1). When performing UL-MU transmission control, processing is performed in the order of radio information collection (S2), grouping calculation (S3), and scheduling calculation (S4). When the UL-MU transmission control is stopped, by turning off the control in the radio control apparatus 10 (S5, No), the processing in the scheduling calculation unit 112 is stopped, and the entire processing ends.

In the radio information collection (S2), the radio information collection unit 12 of the radio control apparatus 10 polls the AP 20 and the STA 30, acquires radio information, and stores the information in the radio information database unit 13.

Figure 8:
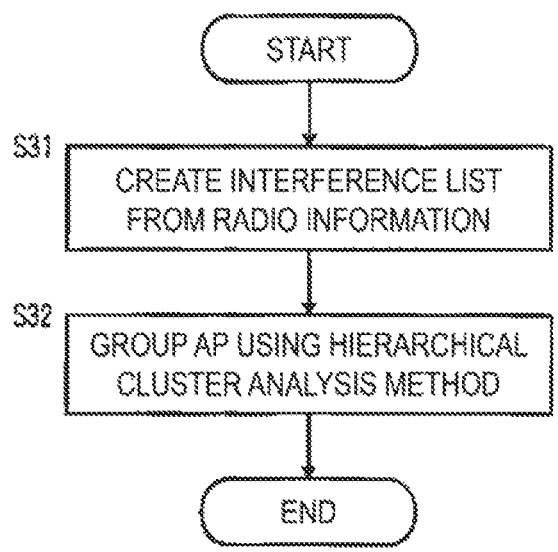
FIG. 8 is a flowchart illustrating an example of a processing procedure of a grouping calculation (S3) using a hierarchical cluster analysis method.

FIG. 8 illustrates an example of a processing procedure of grouping calculation (S3) using a hierarchical cluster analysis method.

In FIG. 8, the grouping calculation unit 111 of the AP control unit 11 of the radio control apparatus 10 extracts the radio information collected from the radio information database unit 13 and creates an interference list (S31). Subsequently, the grouping calculation unit 111 groups the APs using the hierarchical cluster analysis method (S32).

Figure 9:
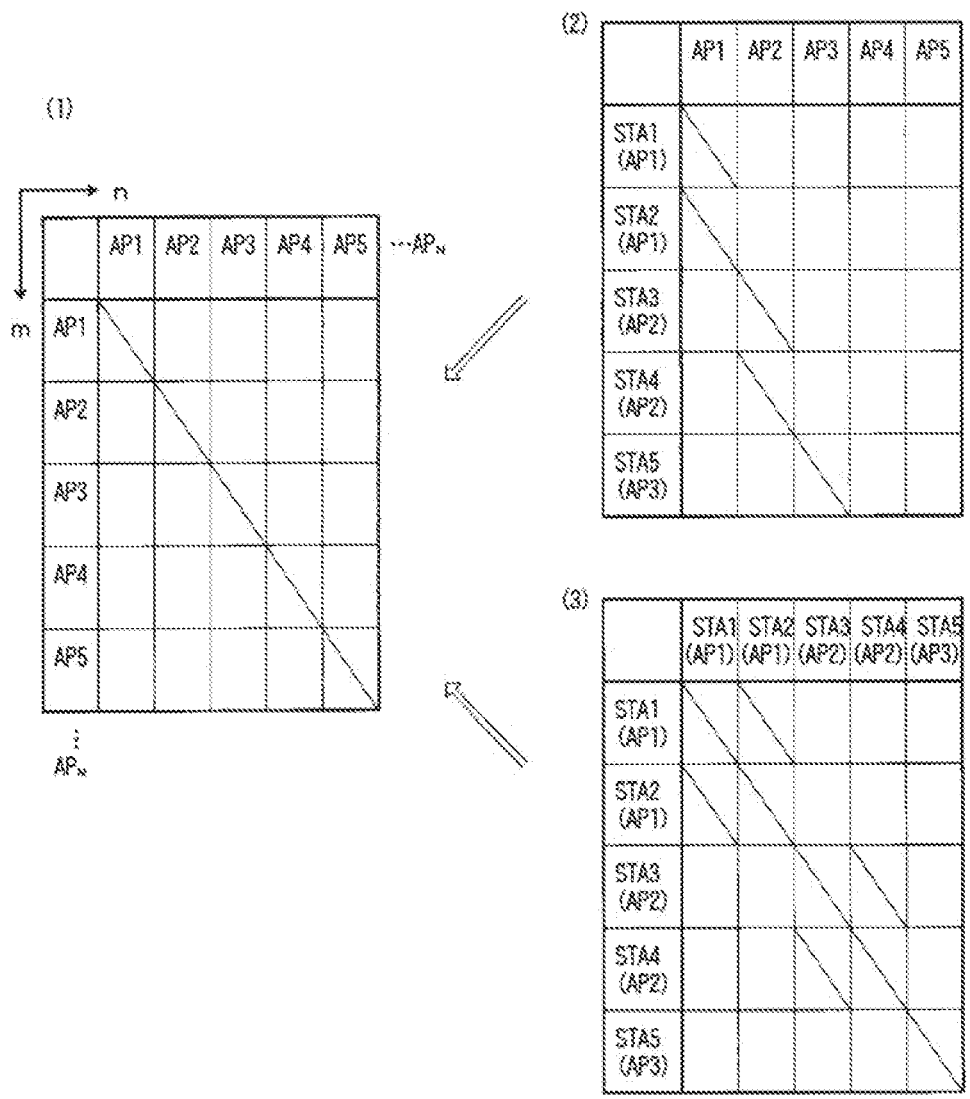
FIG. 9 is a diagram illustrating an example of creating an interference list.

FIG. 9 illustrates an example of creating the interference list.

The interference list in FIG. 9 (1) is an example created based on the peripheral AP information (RSSI) collected from each AP. The interference list of FIG. 9 (2) is an example in which among the peripheral AP information (RSSI) collected from each STA, the maximum one in the peripheral AP information (RSSI) from the STAs belonging to the AP is set as the interference between an APm and an APn. The interference list of FIG. 9 (3) is an example in which among the peripheral STA information (RSSI) collected from each STA, the maximum one in the peripheral STA information (RSSI) from the STAs belonging to the AP is set as the interference between the APm and the APn. The interference list of the example (1) may be created from the interference lists of the examples (2) and (3).

Figure 10:
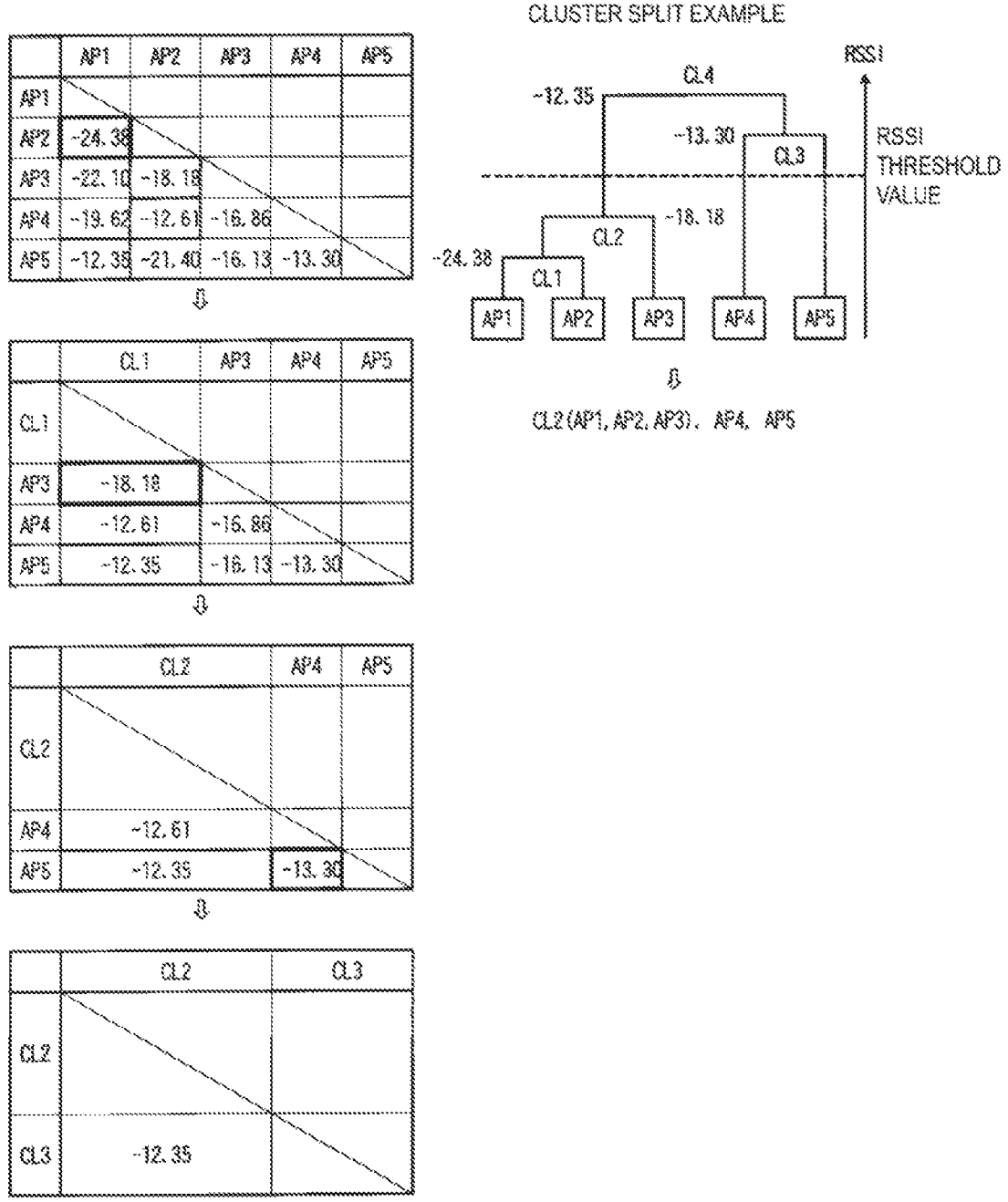
FIG. 10 is a diagram illustrating an example of grouping using the hierarchical cluster analysis method.

FIG. 10 illustrates an example of grouping using the hierarchical cluster analysis method.

In FIG. 10, the grouping calculation unit 111 sequentially groups the APs having small RSSI values based on the interference list between the AP1 to the AP5. First, the grouping calculation unit 111 sets the AP1 and the AP2 as a cluster (CL) 1.

Subsequently, the grouping calculation unit 111 calculates the distance (RSSI) between the CL1 and another AP. The distance between the CL1 and the AP3 is the maximum distance between the AP1 and the AP2 that constitutes the CL1 and the AP3 and the distance between the AP2 and the AP3 (RSSI=−18.18) is the maximum here, and thus the distance between the CL1 and the AP3 becomes −18.18. Similarly, the distance between the CL1 and the AP4 is −12.61, and the distance between the CL1 and the AP5 is −12.35. The distance between the AP3, the AP4, and the AP5 remains the same. Among them, when the ones having the smallest distance are grouped, the distance −18.18 between the CL1 and the AP3 becomes the smallest, and thus the CL1 and the AP3 are set to a CL2.

Subsequently, when the distance between the CL2 and other APs are calculated, the distance between the CL2 and the AP4 is −12.61, the distance between the CL1 and the AP5 is −12.35, and the distance between the AP4 and the AP5 is −13.30. Among them, when the ones having the smallest distance are grouped, the distance −13.30 between the AP4 and the AP5 becomes the smallest, and thus the AP4 and the AP5 are set to a CL3.

Subsequently, the grouping calculation unit 111 calculates the distance between the CL3 and another AP (CL). When the maximum value of each distance between the AP4 and the AP5 that constitute the CL3 and the AP1, the AP2 and the AP3 that constitute the CL2 is calculated, the distance between the AP5 and the AP1 is −12.35, which is the distance between the CL3 and the CL2.

Subsequently, the grouping calculation unit 111 performs grouping by comparing the distance (RSSI value) between clusters with a RSSI threshold value. In the case of FIG. 10, there is an RSSI threshold value between the CL2 and the CL3, and thus three groups, CL2 (the AP1, the AP2, and AP3), the AP4, and the AP5 are grouped.

Figure 11:
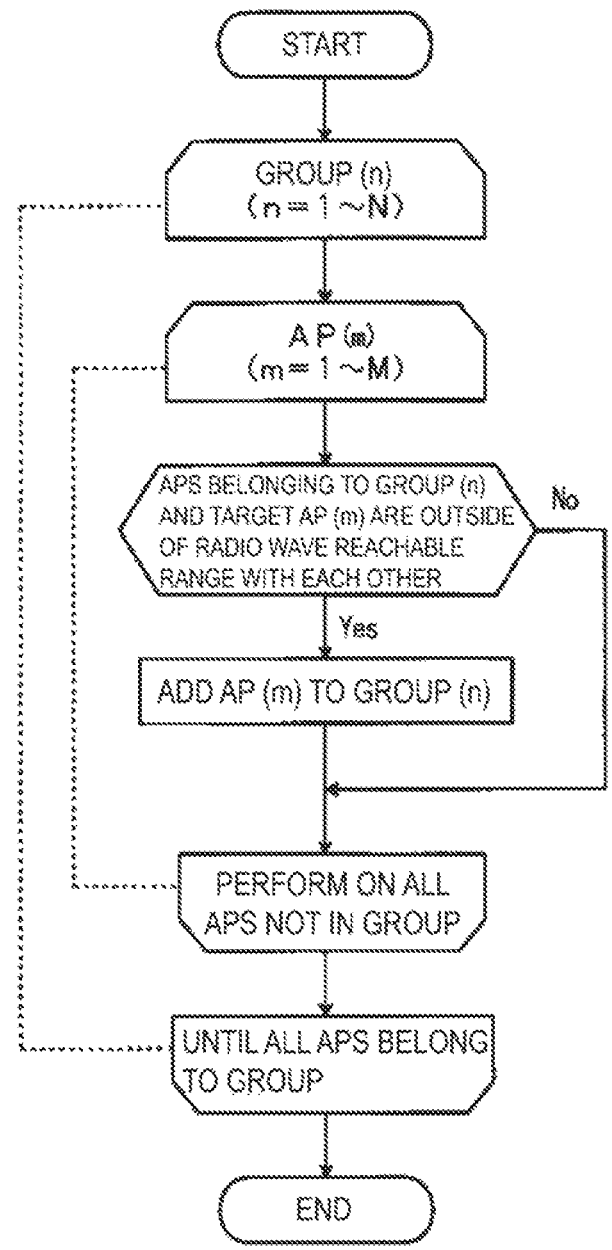
FIG. 11 is a flowchart illustrating an example of a processing procedure of a grouping calculation (S3) using an AP random grouping method.

FIG. 11 illustrates an example of a processing procedure of grouping calculation (S3) using an AP random grouping method.

In the AP random grouping method, the grouping calculation unit 111 determines whether all APs in the target group and one randomly extracted AP which is not in the target group, are outside of the radio wave reachable range, and performs whether to add the AP to the group. Here, n is a group number, m is an AP number, and Group (n) is an AP group constituting the group number n.

The grouping calculation unit 111 (1) starts processing assuming that all APs do not belong to a group.
(2) Create a first group, and attach a randomly selected AP to the group.
(3) Randomly select the AP outside of the radio wave reachable range of the entire group, and attach the AP to the group.
(4) Repeat (3) until there are no APs outside of the radio wave reachable range.
(5) Return to (2) and create the next group. When there is no AP that does not belong to the group, the processing is stopped.

Figure 12:
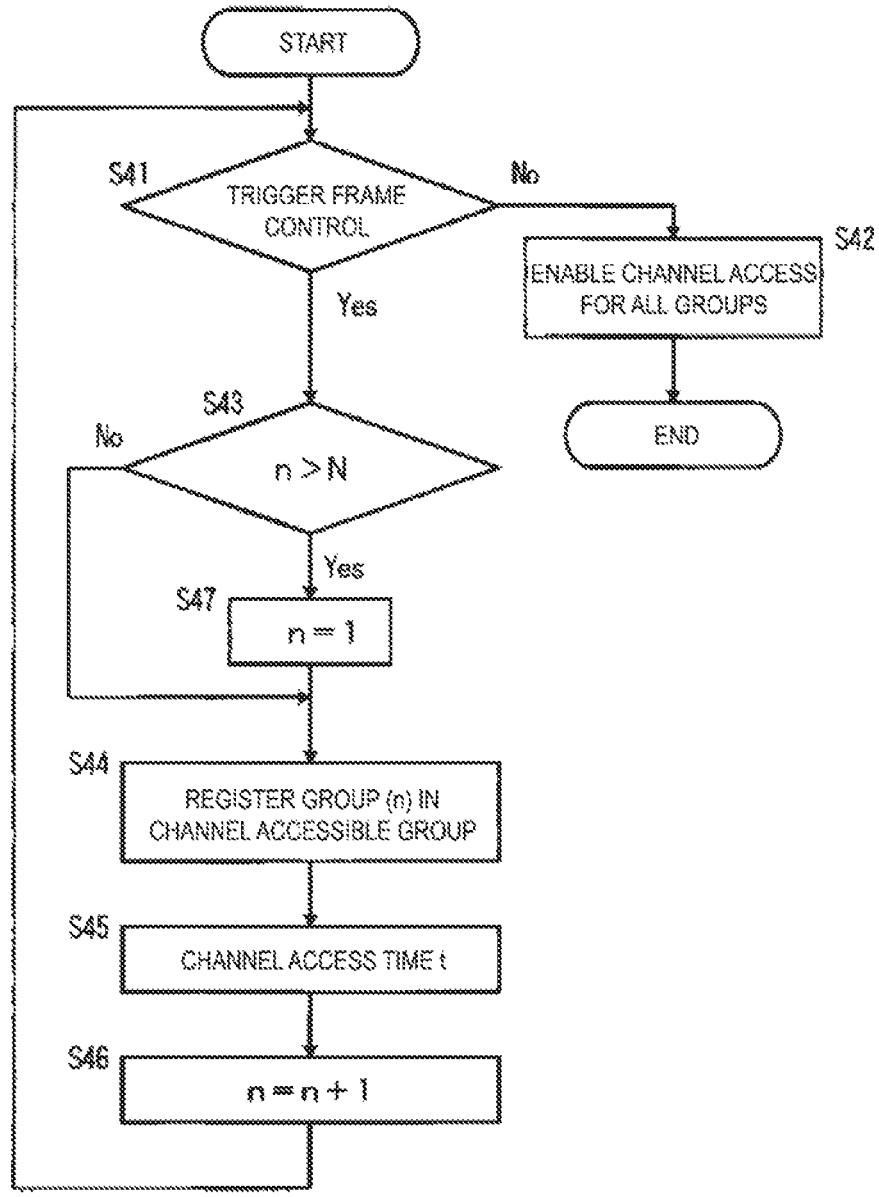
FIG. 12 is a flowchart illustrating an example of a processing procedure of a scheduling calculation (S4).

FIG. 12 illustrates an example of a processing procedure of the scheduling calculation (S4).

In FIG. 12, when the scheduling calculation is started, the scheduling calculation unit 112 first confirms the presence/absence of the trigger frame control used for UL-MU transmission (S41). When no control is performed, the scheduling calculation unit 112 enables channel access for all groups (S42) and ends the processing. When the processing is performed (S41—Yes), the scheduling calculation unit 112 registers the group (n) (n is 1 to N, N is the number of groups) in the channel accessible group (S43, S44), and sequentially assigns t [msec] as channel access time (S45). The scheduling calculation unit 112 increments the group number n (S46) and returns to the step S41. The scheduling calculation unit 112 returns to the group (1) after the group (N) (S47). The scheduling calculation unit 112 performs the processing until there is no trigger frame control of UL-MU transmission to set.

The scheduling calculation unit 112 may transmit RTS/CTS to all APs belonging to the groups other than the group n and set NAV to a terminal of the groups other than the transmittable group, instead of the processing of the S44.

Figure 13:
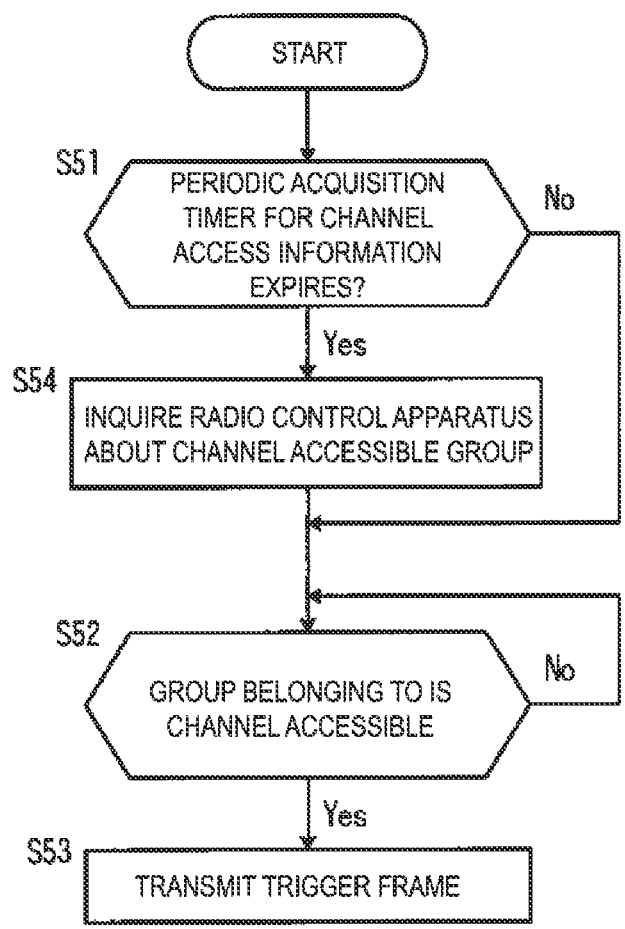
FIG. 13 is a flowchart illustrating an example of a processing procedure of an AP.
Figure 14:
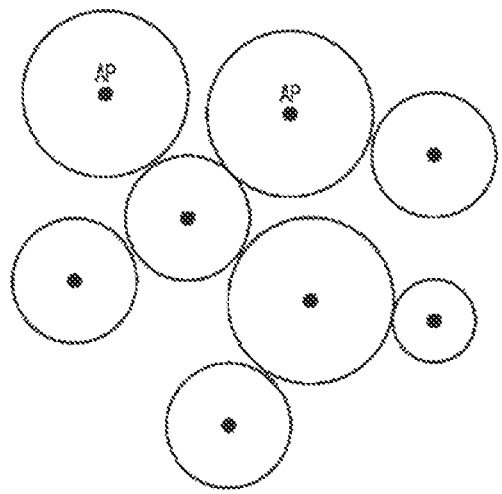
FIG. 14 is a diagram illustrating an example of control of a radio wave reachable range during a normal AP operation.
Figure 15:
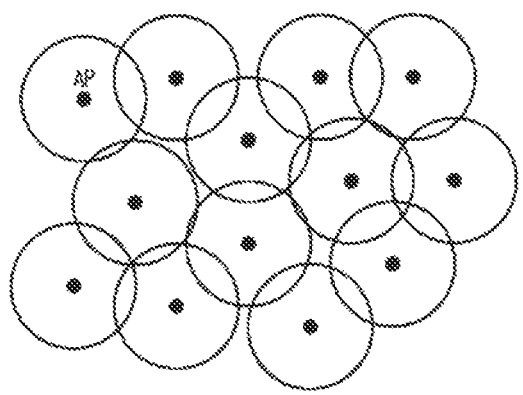
FIG. 15 is a diagram illustrating an example of control of a radio wave reachable range in an AP high-density environment.
Figure 16:
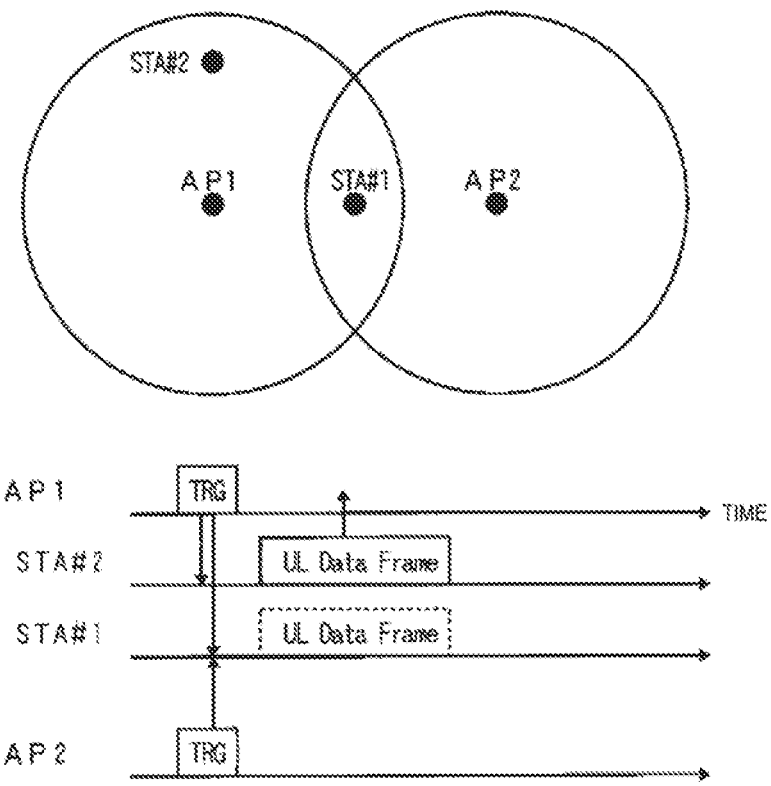
FIG. 16 is a diagram illustrating a principle of trigger frame collision.
Figure 17:
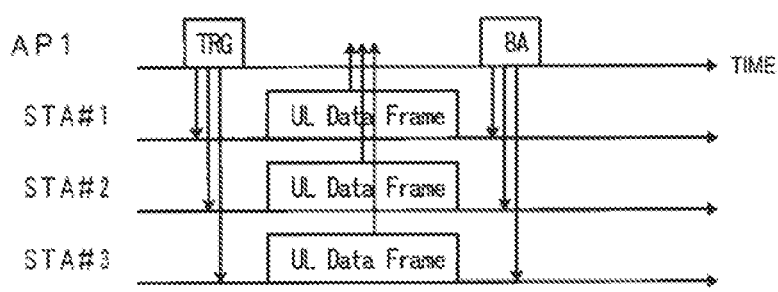
FIG. 17 is a diagram illustrating a UL-OFDMA sequence in 11ax.

FIG. 13 illustrates an example of the processing procedure of the AP.

In FIG. 13, after the back-off time elapses, until a periodic acquisition timer for channel access information times out (S51—No) and when channel access of the group to which the AP belongs is possible (S52—Yes), the AP transmits a trigger frame (S53). When the periodic acquisition timer for channel access information times out (S51—Yes), the AP inquires the radio control apparatus 10 about the channel accessible group (S54). Here, when the channel access of the group to which the AP belongs is possible (S52—Yes), the AP transmits a trigger frame (S53). When the group to which the AP belongs is not the current channel accessible group, the AP holds transmission until the group the AP belongs to becomes channel accessible.

REFERENCE SIGNS LIST

10 Radio control apparatus
11 AP control unit
111 Grouping calculation unit
112 Scheduling calculation unit
12 Radio information collection unit
13 Radio information database unit
14 Connection I/F unit
20 Wireless LAN base station (AP)
21 Control unit
211 Radio information acquisition unit
212 Radio information notification unit 212
22 Connection I/F unit
23 Antenna
24 Radio processing unit
30 Wireless LAN terminal (STA)
31 Control unit
311 Radio information acquisition unit
312 Radio information notification unit
32, 33 Antenna
34 Radio processing unit

The invention claimed is:

1. A wireless LAN system in which a plurality of BSSs using an identical channel respectively perform uplink multi-user transmission, such that each BSS is composed of one wireless LAN base station and a plurality of wireless LAN terminals belonging to the wireless LAN base station, and the wireless LAN system comprising:
a radio control apparatus that is connected to the wireless LAN base station of each of the plurality of the BSSs and a wireless LAN terminal of the plurality of wireless LAN terminals of each of the plurality of the BSSs, and configured to collect radio information indicating interference states of respective radio waves,
wherein the radio control apparatus groups BSSs into groups of BSSs according to the radio information and controls access to the channel by shifting timing of control frames transmitted by a given wireless LAN base station, such that BSSs that are outside of the radio wave reachable range of each other are grouped together in a given group of BSSs, and wireless LAN base stations in the given group of BSSs access the channel at the same time but access the channel at different times from wireless LAN base stations in other groups of BSSs.

2. The wireless LAN system according to claim 1, wherein
the radio control apparatus is configured to perform grouping processing for selecting a combination that results in a minimum group number among combinations in which received power from the wireless LAN base station and the wireless LAN terminal between the sets of BSSs is equal to or lower than a predetermined level, based on the radio information.

3. The wireless LAN system according to claim 2, wherein
the radio control apparatus is configured to perform grouping calculation using a hierarchical cluster analysis method of sequentially grouping the sets of BSSs having the received power of low value.

4. The wireless LAN system according to claim 2, wherein
the radio control apparatus is configured to perform grouping calculation using a random grouping method of randomly selecting, with respect to a first BSS of the plurality of the BSSs that has formed a first group, a second BSS of the plurality of the BSSs that is outside of entire radio wave reachable range of a first group and attach a second BSS to a first group.

5. The wireless LAN system according to claim 1, wherein
the radio control apparatus is configured to sequentially assign channel access timing to a group n (n is 1 to N, N is a group number) at a predetermined time interval.

6. The wireless LAN system according to claim 5, wherein
the radio control apparatus is configured to sequentially assign channel access timing to the group n (n is 1 to N, N is a group number) at a predetermined time interval and set NAV for other groups.

7. The wireless LAN system according to claim 1, wherein
the radio control apparatus is configured to notify whether channel access is possible in response to an inquiry from the wireless LAN base station of each of the plurality of groups.

8. An uplink control method of a wireless LAN system in which a plurality of BSSs using an identical channel respectively perform uplink multi-user transmission, such that each BSS is composed of one wireless LAN base station and a plurality of wireless LAN terminals belonging to the wireless LAN base station, the uplink control method comprising:
by a radio control apparatus that is connected to the wireless LAN base station of each of the plurality of the BSSs and a wireless LAN terminal of the plurality of wireless LAN terminals of each of the plurality of the BSSs, collecting radio information indicating interference states of respective radio waves;

grouping BSSs into groups of BSSs according to the radio information, such that BSSs that are outside of the radio wave reachable range of each other are grouped together in a given group of BSSs; and controling access to the channel by shifting timing of control frames transmitted by a given wireless LAN base station, where wireless LAN base stations in the given group of BSSs access the channel at the same time but access the channel at different times from wireless LAN base stations in other groups of BSSs.

9. A radio control apparatus of a wireless LAN system in which a plurality of BSSs using an identical channel respectively perform uplink multi-user transmission, such that each BSS is composed of one wireless LAN base station and a plurality of wireless LAN terminals belonging to the wireless LAN base station, wherein the radio control apparatus is connected to the wireless LAN base station of each of the plurality of the BSSs and a wireless LAN terminal of the plurality of wireless LAN terminals of each of the plurality of the BSSs, comprising:

a processor; and a storage medium having computer program instructions stored thereon, when executed by the processor, perform to:

collect radio information indicating interference states of respective radio waves, group BSSs into groups of BSSs according to the radio information, such that BSSs that are outside of the radio wave reachable range of each other are grouped together in a given group of BSSs; and control access to the channel by shifting timing of control frames transmitted by a given wireless LAN base station, where wireless LAN base stations in the given group of BSSs access the channel at the same time but access the channel at different times from wireless LAN base stations in other groups.

* * * * *